(12) United States Patent
Chen et al.

(10) Patent No.: US 11,155,213 B2
(45) Date of Patent: Oct. 26, 2021

(54) ROOF LUGGAGE RACK, ROOF LUGGAGE RACK ASSEMBLY, AND VEHICLE HAVING ROOF LUGGAGE RACK

(71) Applicant: WINBO-DONGJIAN AUTOMOTIVE TECHNOLOGY CO., LTD., Foshan (CN)

(72) Inventors: Yongbo Chen, Foshan (CN); Zhihai Zhang, Foshan (CN); Wei Hu, Foshan (CN); Wenxiang He, Foshan (CN); Jie Yang, Foshan (CN); Weiting He, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 112 days.

(21) Appl. No.: 16/714,825

(22) Filed: Dec. 16, 2019

(65) Prior Publication Data
US 2020/0114829 A1    Apr. 16, 2020

Related U.S. Application Data

(63) Continuation of application No. PCT/CN2017/103926, filed on Sep. 28, 2017.

(30) Foreign Application Priority Data

Jul. 31, 2017  (CN) .......................... 201720941964.5

(51) Int. Cl.
*B60R 9/04* (2006.01)
*B60Q 1/26* (2006.01)

(52) U.S. Cl.
CPC . *B60R 9/04* (2013.01); *B60Q 1/26* (2013.01)

(58) Field of Classification Search
CPC .. B60R 9/04; B60R 11/04; B60Q 1/26; B60Q 1/2603
See application file for complete search history.

(56) References Cited

U.S. PATENT DOCUMENTS 4,269,339 A * 5/1981 Bott .......................... B60R 9/04
224/309
4,426,028 A * 1/1984 Bott .......................... B60R 9/04
224/325
(Continued)

FOREIGN PATENT DOCUMENTS

CN    202782955 U    3/2013
CN    105480146 A    4/2016
(Continued)

OTHER PUBLICATIONS

International search report,PCT/CN2017/103926, dated May 8, 2018 (2 pages).
(Continued)

*Primary Examiner* — Brian D Nash

(57) ABSTRACT

A roof luggage rack, a roof luggage rack assembly, and a vehicle having a roof luggage rack are provided. The roof luggage rack includes a body portion, defining a receiving chamber, and an illuminator, arranged in the receiving chamber. According to present the roof luggage rack, a lighting effect is provided to illuminate a side of the vehicle. A driver can observe a traffic condition or check articles carried on the luggage rack at night. Further, the luggage rack may have a dazzling lighting effect, and the vehicle may have an aesthetic appearance.

16 Claims, 6 Drawing Sheets

(56) References Cited

U.S. PATENT DOCUMENTS

| | | | | |
|---|---|---|---|---|
| 4,534,496 A | * | 8/1985 | Bott | B60Q 1/2661 224/321 |
| 4,800,470 A | * | 1/1989 | Hartsaw | B60Q 1/0011 362/249.12 |
| 5,306,156 A | * | 4/1994 | Gibbs | B60Q 1/302 439/34 |
| 6,114,954 A | * | 9/2000 | Palett | B60R 9/00 340/475 |
| 6,322,232 B1 | | 11/2001 | Oliver | |
| 8,985,414 B2 | | 3/2015 | Aftanas | |
| 10,759,330 B1 | * | 9/2020 | Salter | B60Q 1/18 |
| 2003/0231485 A1 | * | 12/2003 | Chien | F21S 2/00 362/84 |
| 2007/0217212 A1 | * | 9/2007 | Klinkman | B60Q 1/24 362/493 |
| 2011/0240695 A1 | | 10/2011 | Aftanas | |
| 2012/0031939 A1 | * | 2/2012 | Jutila | B60Q 1/24 224/326 |
| 2013/0135880 A1 | * | 5/2013 | Michie | B60R 9/04 362/459 |
| 2015/0138803 A1 | * | 5/2015 | Salter | F21S 41/16 362/510 |
| 2016/0121799 A1 | * | 5/2016 | McClintock | B60R 9/04 224/309 |
| 2017/0066382 A1 | * | 3/2017 | Aftanas | B60R 9/04 |
| 2017/0120805 A1 | * | 5/2017 | Marchese | B60Q 1/24 |
| 2019/0111831 A1 | * | 4/2019 | Gomes | B60Q 1/2611 |
| 2020/0114808 A1 | * | 4/2020 | Chen | B60R 9/058 |
| 2020/0114809 A1 | * | 4/2020 | Chen | B60R 9/058 |
| 2020/0114829 A1 | * | 4/2020 | Chen | B60Q 1/2611 |

FOREIGN PATENT DOCUMENTS

| | | |
|---|---|---|
| CN | 205905900 U | 1/2017 |
| CN | 107089200 A | 8/2017 |
| CN | 107139849 A | 9/2017 |

OTHER PUBLICATIONS

Australian First Examination report, Australian Application No. 2017425569, dated Jun. 22, 2020 (4 pages).

Australian Second Examination report, Australian Application No. 2017425569, dated Jul. 31, 2020 (6 pages).

Rakumba lighting components, <URL: https://web.archive.org/web/20160808040318/http://rakumba.com.au/lighting-components/> published on Aug. 8, 2016 as per Wayback Machine.

* cited by examiner

ROOF LUGGAGE RACK, ROOF LUGGAGE RACK ASSEMBLY, AND VEHICLE HAVING ROOF LUGGAGE RACK

CROSS-REFERENCE TO RELATED APPLICATIONS

The present application is a continuation-application of International (PCT) Patent Application No. PCT/CN2017/103926 filed on Sep. 28, 2017, which claims foreign priority of Chinese Patent Application No. 201720941964.5, filed on Jul. 31, 2017, in the National Intellectual Property Administration of China, the entire contents of which are hereby incorporated by reference in their entireties

TECHNICAL FIELD

The present disclosure relates to the field of vehicle parts, and in particular to a roof luggage rack, a roof luggage rack assembly, and a vehicle having a roof luggage rack.

BACKGROUND

A roof luggage rack may be arranged on a top of a suburban utility vehicle (SUV) to provide an aesthetic appearance for the vehicle and to carry articles. A longitudinal rod of the roof luggage rack is typically arranged with a cross rod or a luggage frame to carry outdoor equipments, such as a bicycle, a luggage bag, or the like, allowing travelers to have a convenient trip.

However, luggage racks in the related art may substantially be arranged for carrying articles solely, and does not have a function for illuminating a side of the vehicle. Some luggage rack is arranged with a front light, but no light is arranged on a side of the luggage rack. Therefore, during driving at night, a drive is unable to observe a traffic condition at a side of the vehicle or observe the articles on the luggage rack at night.

SUMMARY OF THE DISCLOSURE

The present disclosure may provide a roof luggage rack, a roof luggage rack assembly, and a vehicle having a roof luggage rack. A lighting effect may be achieved at an outside of the roof luggage rack, such that, during driving at night, a drive may observe a traffic condition of a side road or check an article carried on the luggage rack by virtue of the light at the outside of the roof luggage rack. Further, the light of the luggage rack may provide a dazzling lighting effect for the vehicle, and the vehicle may be more characteristic and have a more aesthetic appearance.

According to a first aspect of the present disclosure, a roof luggage rack may be provided and include following components.

A body portion may be arranged and defines a receiving chamber.

An illuminator may be arranged in the receiving chamber of the body portion.

According to another aspect of the present disclosure, a roof luggage rack assembly may be provided and include two longitudinal rods and two cross rods. The two cross rods may be arranged between the two longitudinal rods and perpendicular to both the two longitudinal rods.

At least one of the two longitudinal rods may include a body portion of the luggage rack and an illuminator. The body portion may define a receiving chamber, and the illuminator may be arranged in the receiving chamber of the body portion.

According to still another aspect of the present disclosure, a vehicle having a roof luggage rack may be provided and include following components.

A body portion of the luggage rack may be provided and define a receiving chamber.

An illuminator may be arranged in the receiving chamber of the body portion.

A vehicle portion may be arranged to support the body portion of the luggage rack.

A fastening member may be arranged to fasten the body portion of the luggage rack with the vehicle portion.

According to the above aspects, following beneficial effects may be achieved.

The illuminator may be arranged in the receiving chamber of the body portion of the roof luggage rack, providing a lighting effect. During driving at night, the illuminator may illuminate to enable the driver to check the articles or equipment carried on the roof luggage rack, such that the articles and equipment may be moved or detached. Further the illuminator may illuminate a side of the vehicle. The illuminator may provide a dazzling lighting effect for the luggage rack, enabling the vehicle to be more characteristic and have an aesthetic appearance.

BRIEF DESCRIPTION OF THE DRAWINGS

Technical solutions of embodiments of the present disclosure or technical solutions in the related art may clearly illustrated by referring to drawings. Obviously, following drawings are for the purposes of illustrating the embodiments of the present disclosure. To ordinary skilled in the art, other drawings may be obtained based on the drawings provided herein without any creative effort.

DETAILED DESCRIPTION

Figure 1:
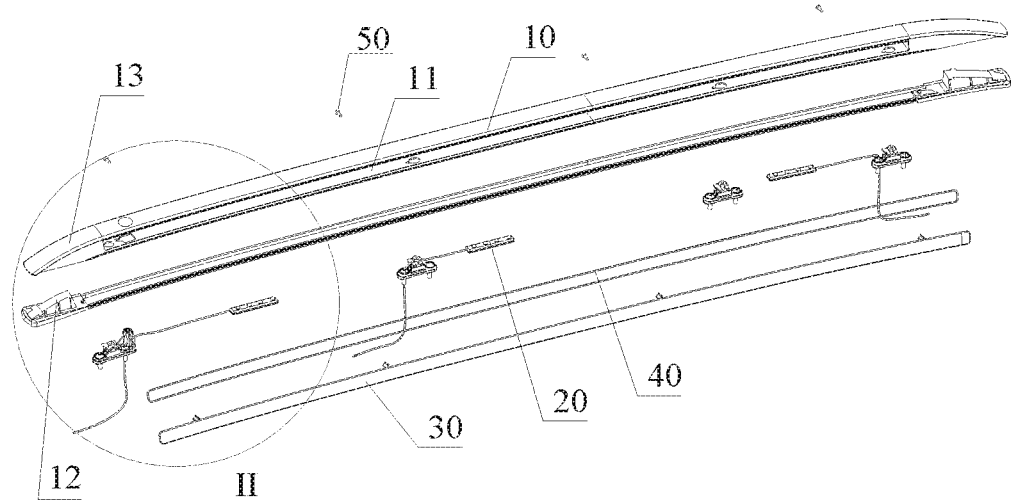
FIG. 1 is an explosive perspective view of a roof luggage rack according to a first embodiment of the present disclosure.

Technical solutions of the present disclosure may be clearly illustrated in details by referring to the drawings. It should be understood that the embodiments illustrated in details herein are for the purposes of explaining the present disclosure but for limiting the scope of the present disclosure. Further to be noted that, to provide an easy description, only a part of structures related to the present disclosure, but not all structures, are shown in the drawings. Other embodiments obtained based on the embodiments of the present disclosure by ordinary skilled in the art without any creative are within the scope of the present disclosure.

Figure 2:
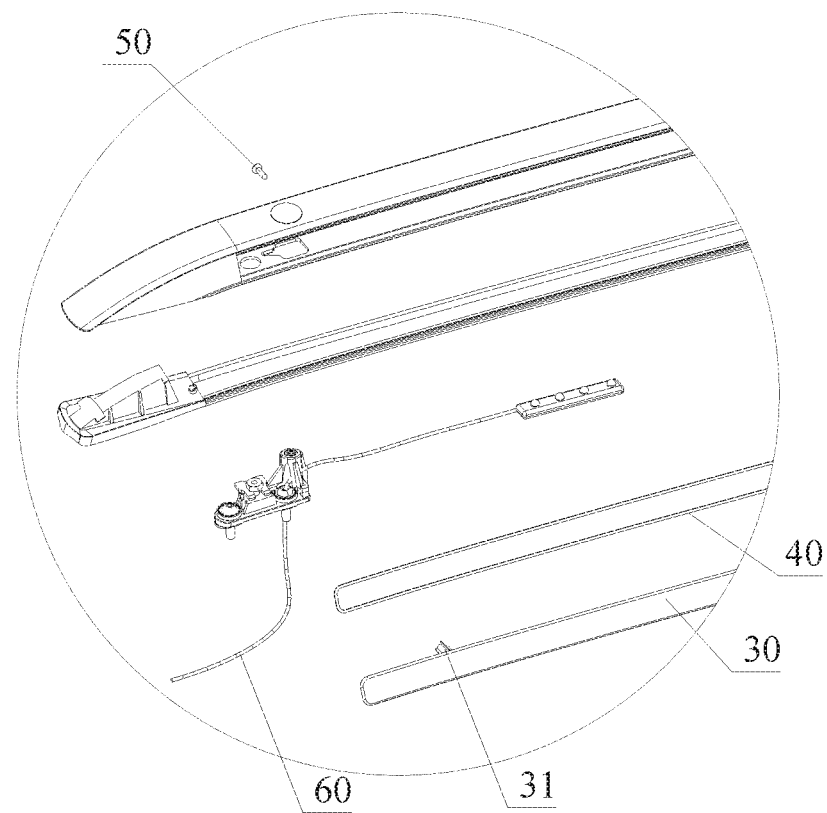
FIG. 2 is an enlarged view of a portion II labelled in the FIG. 1.

As shown in FIG. 1 and FIG. 2, FIG. 1 is an explosive perspective view of a roof luggage rack according to an embodiment of the present disclosure, and FIG. 2 is an enlarged view of a portion A labelled in the FIG. 1.

The roof luggage rack may include a body portion 10 and an illuminator 20. The body portion 10 may define a receiving chamber 11, and the illuminator 20 may be arranged in the receiving chamber 11 of the body portion 10.

The body portion 10 may be made of one of common materials including a stainless steel, an aluminum alloy and high strength plastics (nylon mixed with fiberglass), or a combination thereof.

Further, the body portion 10 may include a base 12 and a cover 13. The cover 13 may be arranged to cover the base 12 to define the receiving chamber 11. The cover 13 may be made into various shapes. In the present embodiment, the cover 13 is in a shape of an arch. It may also be in a shape of a cube, a cylinder, or other regular or irregular geometries. The base 12 and the cover 13 may be made of a same material or different materials. The base 12 and the cover 13 may be connected by welding, adhering, or via fastening members, such as a screw, a bolt, a rivet or the like.

Figure 3:
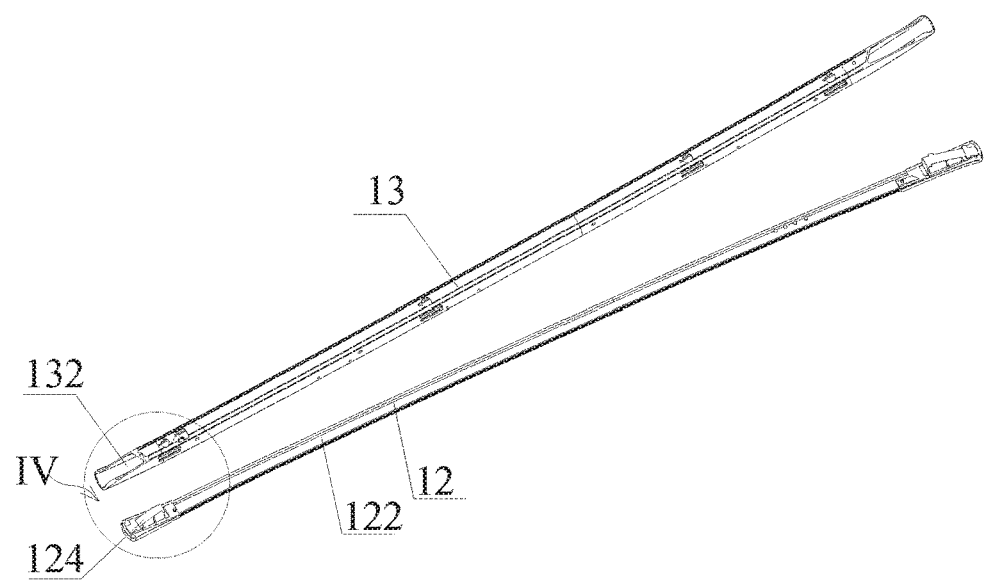
FIG. 3 is an explosive perspective view of a body portion of a luggage rack.
Figure 4:
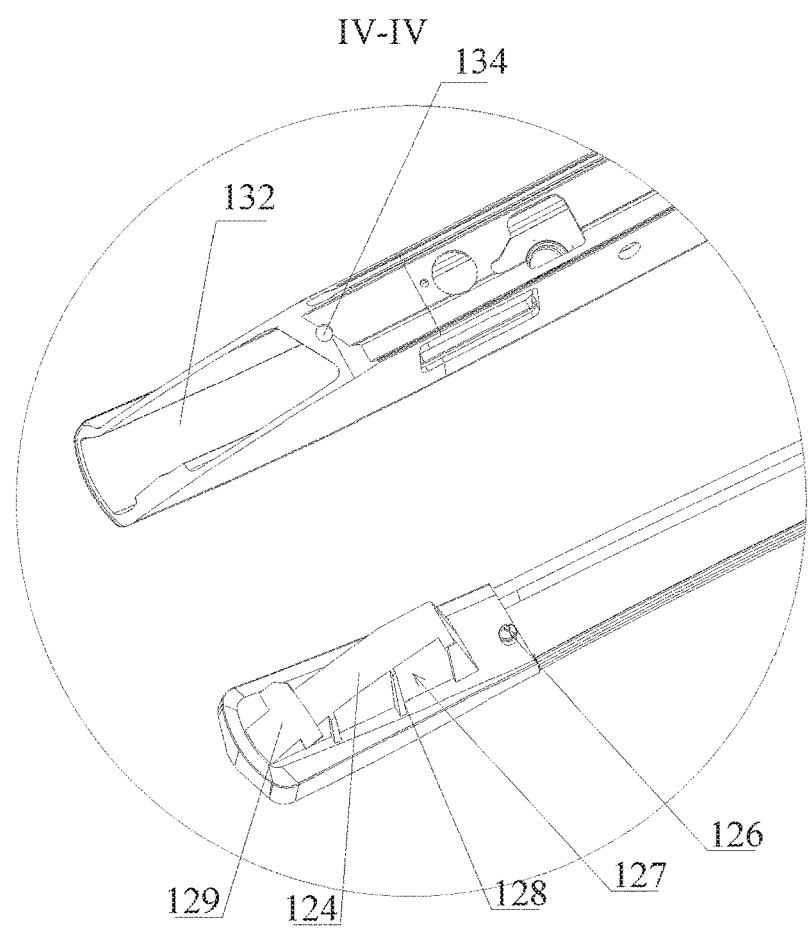
FIG. 4 is an enlarged view of a portion IV labelled in the FIG. 3.

As shown in FIG. 3 and FIG. 4, FIG. 3 is an explosive perspective view of the body portion of the luggage rack, and FIG. 4 is an enlarged view of a portion B labelled in the FIG. 3.

The base 12 further includes a support portion 122 and a head portion 124. The support portion 122 may be arranged to support the cover 13, and the head portion 124 may be arranged at each of two ends of the support portion 122. The cover 13 may further define a receiving portion 132 at a position of which the cover 13 contacts the head portion 124. The head portion 124 may be received in the receiving portion 132. In the present embodiment, the support portion 122 may be a soft sealing strip. The support portion 122 may tightly contact a bottom end face of the cover 13 to provide a support to the cover 13, such that the cover 13 may not rigidly contact the vehicle, and external contaminants may not enter an inside of the body portion 10. The head portion 124 may be made of plastics or a rubber. The head portion 124 may be arranged at each of two ends of the base 12 along a length direction of the base 12. The head portion 124 may be made into various shapes, including a regular shape, such as a shape of a cube or a shape of a cylinder, and an irregular shape. Preferably, a width of the head portion 124 along a width direction of the base 12 may not exceed a width of the base 12. The receiving portion 132 may be defined in the cover 13 at the position of which the cover 13 contacts the head portion 124. The receiving portion 132 may correspond to the head portion 124, such that the head portion 124 may be received in the base 12, and the head portion 124 may be coupled with the receiving portion 132 to form the body portion 10 of the luggage rack.

Further, in the present embodiment, the head portion 124 may have a stereo structure, including a side face, perpendicular to the base 12, and a tilted top face.

Further, a reinforcement rib 128 may be arranged on an end face 127 of the head portion 124 to improve strength of the head portion 124, the end face 127 is perpendicular to the base 12. The head portion 124 may be prevented from being deformed if an external force is applied, such that engagement between the receiving portion 132 and the head portion 124 may not be impacted.

Further, a side of the head portion 124 close to a middle of the body portion 10 may be arranged with a positioning protrusion 126, and a side wall of the receiving portion 132 close to the middle of the body portion 10 may define a positioning hole 134 corresponding to the positioning protrusion 126. The positioning protrusion 126 may be engaged into the positioning hole 134, that is, the positioning protrusion 126 may be inserted into the positioning hole 134, such that the cover 13 may be accurately engaged with the base 12. The positioning protrusion 126 may be arranged as various shapes, such as a shape of a cylinder, a shape of a cube, or the like. A shape of the positioning hole in the cover 13 may be matched with the shape of the positioning protrusion 126 to limit a displacement of the cover 13 relative to the base 12.

Further referring to FIG. 1, a plurality of illuminators 20 may be arranged in the receiving chamber 11 of the body portion 10 and uniformly spaced apart from each other. A light emitted from the plurality of illuminators 20 may pass through an opening of the body portion 10, providing a dazzling lighting effect of the luggage rack. The lighting effect enables the driver to check the articles or equipment carried on the roof luggage rack for moving or detaching, and the plurality of illuminators may further illuminate a side of the vehicle, providing an aesthetic appearance for the vehicle.

Further, the illuminator 20 may be an illuminating bar or an illuminating strip. For example, a light emitting diode (LED) may be welded to a copper wire or a stripped flexible printed circuit board to form a LED strip. The LED strip may emit lights in various colors, and light intensity and brightness may be adjustable. While in use, the colors of the lights may be controlled to change to emit lights with a single color or colors of red-green-blue (RGB), such that the roof luggage rack may achieve a dazzling lighting effect.

Further referring to FIG. 1 and FIG. 2, the roof luggage rack may further include a transparent lid 30, arranged to cover the opening of the body portion 10, preventing external contaminants from entering the inside of the body portion 10 of the roof luggage rack. The transparent lid 30 may be made of a stainless steel, an acrylic material, a transparent polycarbonate material, a transparent acrylonitrile butadiene styrene material, or a transparent polystyrene material. A shape of the transparent lid 30 may be various, with the proviso of completely covering the opening of the body portion 10.

Further, a plurality of screw posts 32a may be arranged on the transparent lid 30 along a central line of a length direction and uniformly spaced apart from each other.

Figure 5:
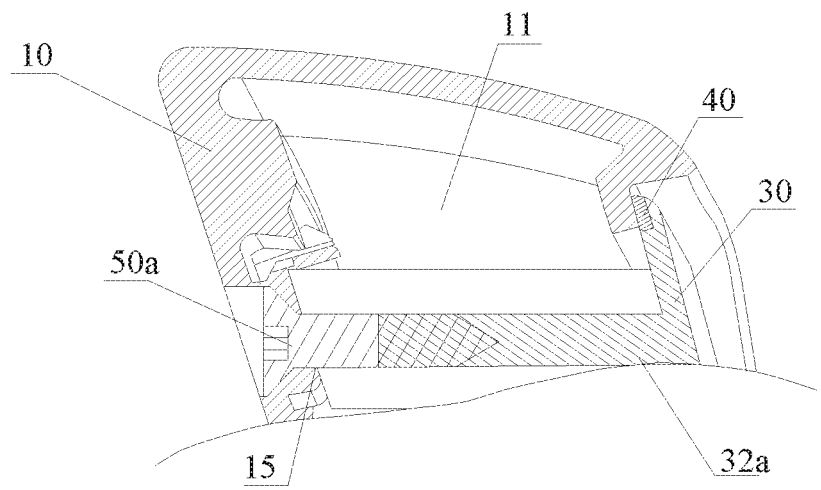
FIG. 5 is a cross sectional view of a roof luggage rack according to an embodiment of the present disclosure.

As shown in FIG. 5, a cross sectional view of a roof luggage rack according to an embodiment of the present disclosure is provided. The roof luggage rack may include a first fastening member 50. The first fastening member 50 may be in various forms. In the present embodiment, the first fastening member may be a self-tapping screw 50a, but may also be any other element that can fasten components to achieve a fixed connection. The self-tapping screw 50a may be arranged on a side of the body portion 10 away from the transparent lid 30. The side of the body portion 10 may define a through hole 15, and the self-tapping screw 50a may extend through the through hole 15 to rotate into one of the plurality of screw posts 32a on the transparent lid 30 to fixedly connect to the one of the plurality of screw posts 32a, such that the transparent lid 30 may be fixed to cover the opening of the body portion 10.

Further, the plurality of screw posts 32a may be arranged on the transparent lid 30 along the central line of the length direction and uniformly spaced apart from each other, such an arrangement of the plurality of screw posts 32a allows external forces to evenly apply to the transparent lid 30, such that the transparent lid 30 may be firmly fixed to cover the opening of the body portion 10.

Figure 6:
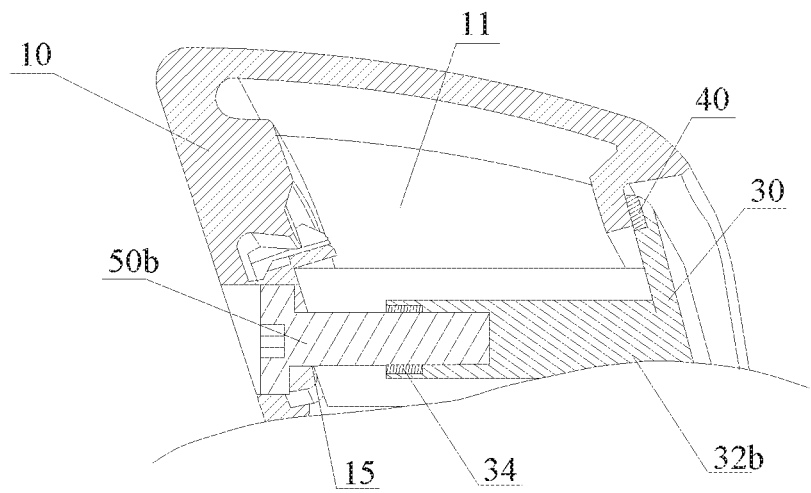
FIG. 6 is a cross sectional view of a roof luggage rack according to another embodiment of the present disclosure.

As shown in FIG. 6, a cross sectional view of a roof luggage rack according to an embodiment of the present disclosure is provided.

A side of the transparent lid 30 facing to the body portion 10 may be arranged with a screw post 32b, and the screw post 32b may define a cavity. An end of the screw post 32b having the cavity may be sleeved by a nut 34. In the present embodiment, the first fastening member 50 may be a screw 50b, arranged on a side of the body portion 10 away from the transparent lid 30. The side of the body portion 10 away from the transparent lid 30 may define a through hole 15. The screw 50b may extend through the through hole 15 to connect to the nut 34 by threading, such that the screw 50b may be coupled with the nut 34. Similarly, a plurality of screw posts 32b may be arranged on the transparent lid 30 along the central line of the length direction and uniformly spaced apart from each other to allow external forces to evenly apply to the transparent lid 30, such that the transparent lid 30 may be firmly fixed to cover the opening of the body portion 10. According to the present embodiment, the screw 50b, instead of a fastening member, is arranged to connect with the nut. The screw and the nut may be detached frequently without destroying the thread, reducing a frequency of replacing the transparent lid.

Figure 7:
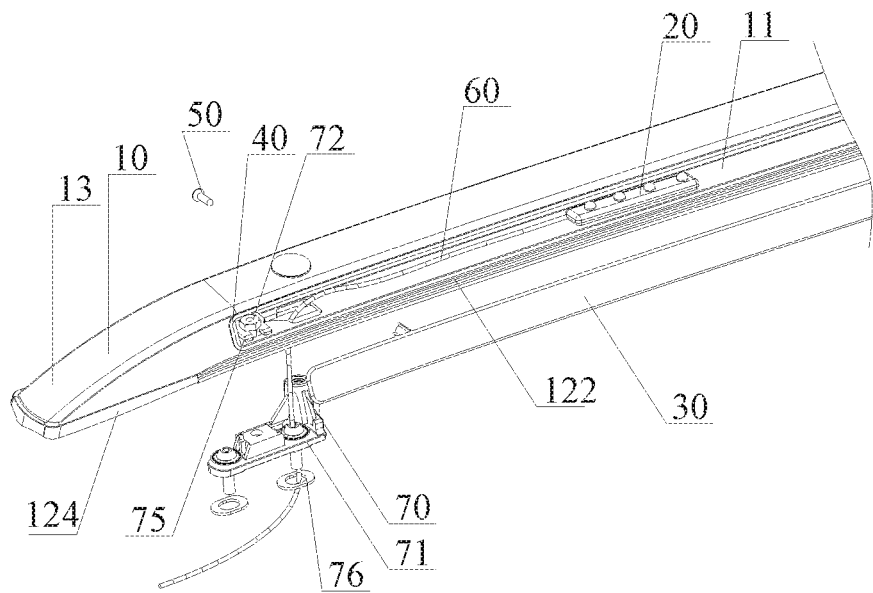
FIG. 7 is an enlarged view of an explosive state of a roof luggage rack.

As shown in FIG. 7, an enlarged view of a portion of an explosive state of the roof luggage rack is provided.

A water-proof rubber 40 may be arranged to surround a contact position between the body portion 10 and the transparent lid 30. A shape of the water-proof rubber 40 may match with the shape of the opening of the body portion 10 to further improve a sealing effect of the transparent lid 30.

Figure 8:
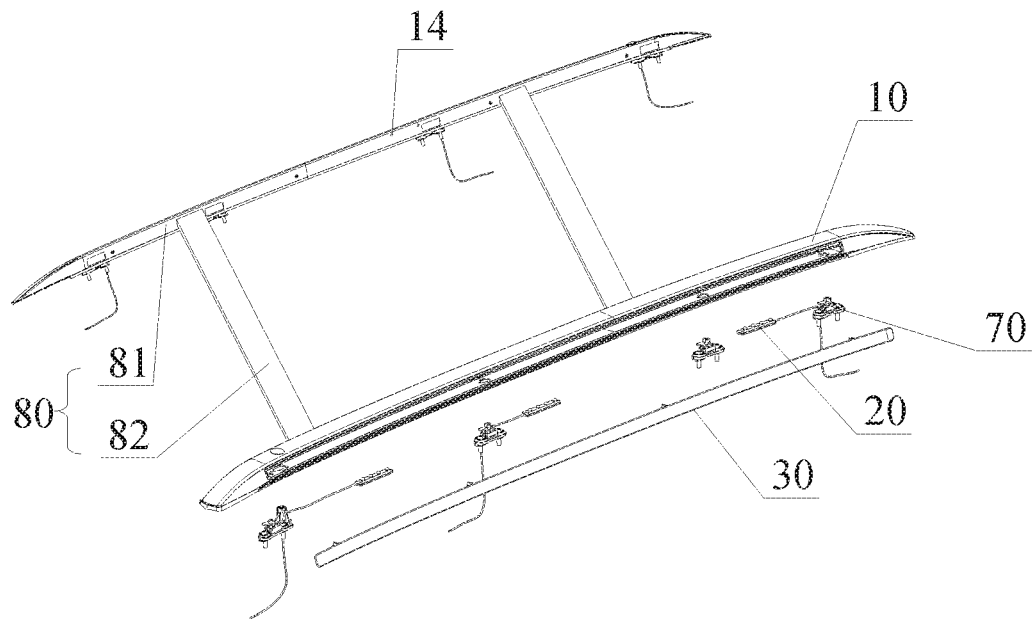
FIG. 8 is an explosive perspective view of a roof luggage rack assembly according to an embodiment of the present disclosure.

As shown in FIG. 8, a perspective view of a roof luggage rack assembly according to an embodiment of the present disclosure is provided.

The roof luggage rack assembly may include two longitudinal rods 81 and two cross rods 82. The two cross rods 82 may be arranged between the two longitudinal rods 81 and perpendicular to both the two longitudinal rods 81. At least one of the two longitudinal rods 81 may include a body portion 10 and an illuminator 20. The body portion 10 may define a receiving chamber 11, and the illuminator 20 may be received in the receiving chamber 11. In the present embodiment, each of the two longitudinal rods of the roof luggage rack assembly may include the body portion 10 and the illuminator 20. A side of the body portion 10 away from the transparent lid 30 may define a through hole 14. While setting up one of the two cross rods 82, a screw (not shown in the figure) may be arranged to extend through the through hole 14 from the receiving chamber 11 to an outside of the body portion 10 to couple with a thread arranged on the one of the two cross rods 82, such that the roof luggage rack assembly may be formed. According to the roof luggage rack assembly, the two longitudinal rods 81 may protect articles from falling off from the roof, and the two cross rods 82 may provide support to the articles, preventing the articles from directly stacking on a top of the vehicle, such that the top of the vehicle may not be scratched and scarred.

In the present embodiment, a structure of the body portion 10 of the roof luggage rack assembly may be identical to the structure of the body portion 10 of the roof luggage rack as described in the above, and will not be repeatedly described herein.

Figure 9:
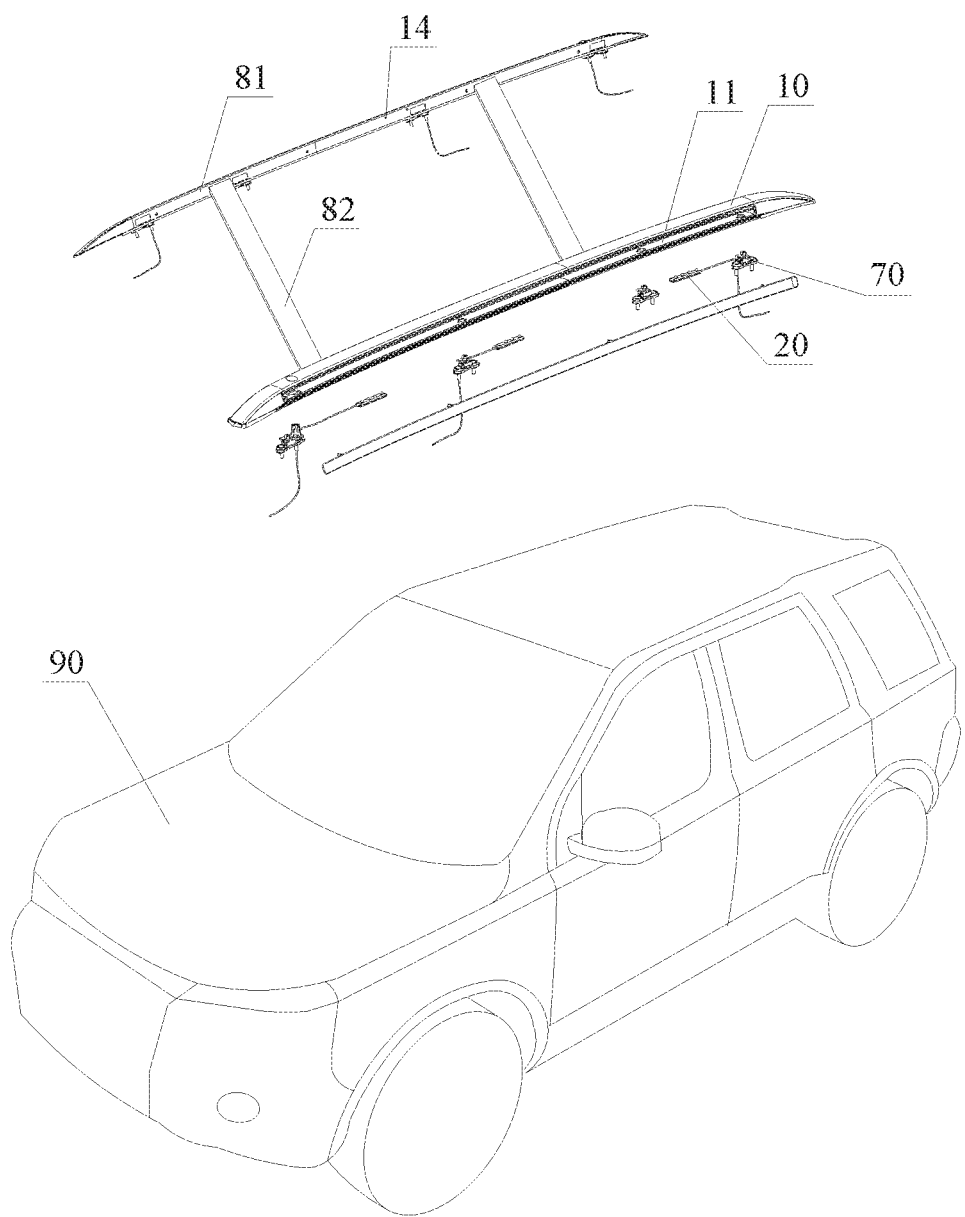
FIG. 9 is an explosive perspective view of a vehicle having a roof luggage rack according to an embodiment of the present disclosure.

As shown in FIG. 9, an exploded perspective view of a vehicle having a roof luggage rack is provided.

The vehicle having the roof luggage rack may include a body portion 10 of the roof luggage rack, an illuminator 20, a vehicle portion 90, and a second fastening member 70. The body portion 10 may define a receiving chamber 11. The illuminator 20 may be received in the receiving chamber 11. The vehicle portion 90 may be arranged to support the body portion 10. The body portion 10 may be mounted on the vehicle portion 90 via the second fastening member 70.

Figure 10:
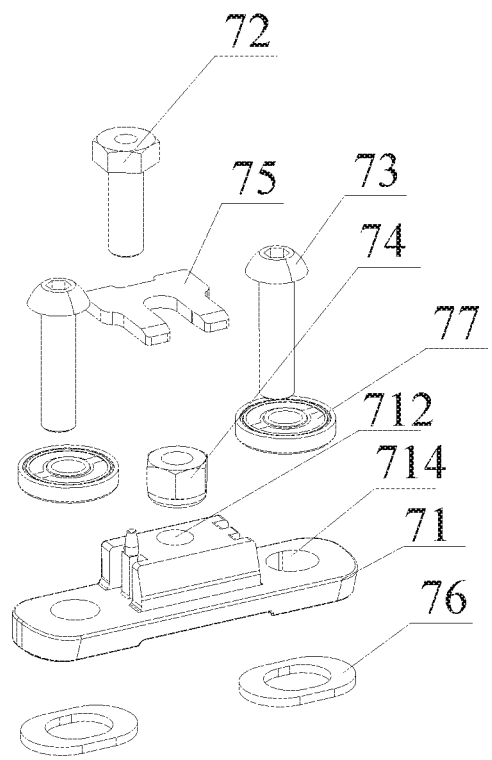
FIG. 10 is an explosive perspective view of a second fastening member.

As shown in FIG. 10, an exploded perspective view of the second fastening member is provided.

The second fastening member includes a mount 71, a first bolt 72, and a second bot 73. The mount 71 may define a screw hole 712 and two through holes 714. The second bolt 73 may be arranged on a side of the mount 71 close to the base 12 and extent through the through hole 714 of the mount 71 to connect to the vehicle portion 90, such that the mount 71 may be fixed with the vehicle portion 90. The first bolt 72 may be received in the receiving chamber 11 and extend out of the body portion 10 through the screw hole 712 to engage with the nut 74. The nut 74 may be arranged on a side of the mount 74 away from the body portion 10. In such a way, the body portion 10 may be fixed with the mount 71.

Figure 11:
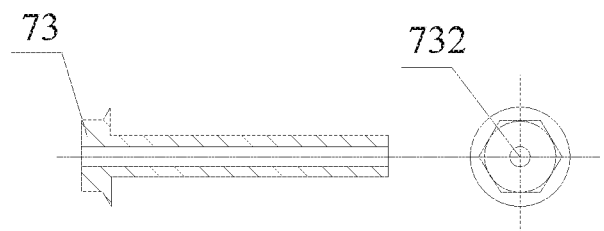
FIG. 11 is a cross sectional view of a second bolt of a roof luggage rack.

As shown in FIG. 11, further referring to FIG. 7, FIG. 11 is a cross sectional view of the second bolt of the roof luggage rack according to the present disclosure.

In the present embodiment, the bolt 73 may be hollow and define a through hole 732 along a central axis of the hollow bolt 73. A wire 60 may be provided, an end of the wire 60 may be connected to the illuminator 20, and the other end of the wire 60 may extend through the body portion 10 and the hollow bolt 73 to reach an inside of the vehicle portion 90. The wire 60 is completely covered by the hollow bolt 73, such that the wire 60 may not be exposed to an outside and may not impact the appearance of the vehicle.

Further referring to FIG. 7 and FIG. 10, the second fastening member 70 may further include a pad 75. The cover 13 (as shown in FIG. 1) may be tightly fastened with the second fastening member 70 via the pad 75 and the first bolt 72, such that the cover 13 may tightly press on the head portion 124 and the support portion 122. The cover 13, the support portion 122, and the head portion 124 may be fixedly connected with each other to form the body portion 10. Further, the support portion 122 may not rigidly contact the cover 13, and external contaminants may be prevented from entering the inside of the body portion 10. By arranging the pad, a contact area between the first bolt 72 and the cover 13 may be increased to improve a friction, such that the first bolt 72 may be prevented from sliding away, further improving immobility of the connection.

Further, the second fastening member 70 may include a sealing rubber 76, arranged to surround a contact position between the vehicle portion 90 and the mount 71 for sealing, such that the external contaminants may not enter the inside of the vehicle portion 90 and the inside of the body portion 10.

The vehicle portion 90 may be a vehicle in any model and requiring a roof luggage rack, such as a sedan, a suburban utility vehicle (SUV), a bus, or the like.

According to the above-mentioned embodiments, following beneficial effects may be achieved.

According to a first aspect of the roof luggage rack provided in the present disclosure, the illuminator may be arranged between the body portion of the luggage rack and the transparent lid, improving the lighting effect. At night, the light emitted from the illuminator may enable the driver to check the articles or equipment carried on the roof luggage rack for moving or detaching. Further, the illuminator may provide a dazzling lighting effect to improve the aesthetic appearance of the luggage rack.

According to a second aspect, the roof luggage rack provided in the present disclosure has a simple structure and may be easily assembled. The hollow bolt may be arranged to assemble the base to allow the wire to extend from the inside of the vehicle through the hollow bolt to reach the inside of the luggage rack, such that the wire may not be exposed to the outside, and the entire luggage rack may look tidy.

As drivers may desire the luggage rack to have more functions than carrying articles only, the luggage rack provided by the present disclosure may fit a consumption concept of the drivers, thus, having a market prospect.

The above-mentioned embodiments are for the purposes of illustrating technical solutions of the present disclosure, but not for limiting the scope of the present disclosure. Although the present disclosure is illustrated in details by referring to the above-mentioned embodiments, the ordinary skilled in the art shall understand that modifications may be performed to the above-mentioned embodiments, and equivalent transformation may be performed to some technical features of the above-mentioned embodiments. The modifications and the equivalent transformation do not drive the essence of the technical solution to depart from the spirit and scope of the embodiments of the present disclosure.

What is claimed is:

1. A roof luggage rack, comprising:
   a body portion, defining a receiving chamber;
   an illuminator, arranged in the receiving chamber;
   wherein the body portion comprises a base and a cover, and the cover is arranged to cover the base to define the receiving chamber;
   the base further comprises a support portion and a head portion, wherein the support portion is arranged to support the cover, and the head portion is arranged at each of two ends of the support portion; and
   the cover defines a receiving portion at a position of which the cover contacts the head portion, and the head portion is received in the receiving portion.

2. The roof luggage rack according to claim 1, wherein the cover is in a shape of an arch.

3. The roof luggage rack according to claim 1, wherein the head portion has a stereo structure, comprising a side face, perpendicular to the base, and a tilted top face.

4. The roof luggage rack according to claim 3, wherein the side face of the head portion perpendicular to the base is arranged with a reinforcement rib to prevent the head portion from being deformed.

5. The roof luggage rack according to claim 1, wherein
   a side of the head portion close to a middle of the body portion is arranged with a positioning protrusion;
   a side wall of the receiving portion close to the middle of the body portion defines a positioning hole corresponding to the positioning protrusion;
   the positioning protrusion is arranged to engage with the positioning hole to provide an accurate engagement between the cover and the base.

6. The roof luggage rack according to claim 1, wherein
   a plurality of illuminators are arranged in the receiving chamber and uniformly spaced apart from each other, a light emitted from the plurality of illuminators pass through an opening of the body portion to reach an outside.

7. The roof luggage rack according to claim 1, further comprising:
   a transparent lid, arranged to cover and seal the opening of the body portion to prevent external contaminants to enter the receiving chamber.

8. The roof luggage rack according to claim 7, wherein
   a side of the transparent lid facing the body portion of the luggage rack is arranged with a screw post;
   the roof luggage rack comprises:
   a fastening member, arranged on a side of the body portion of the luggage rack away from the transparent lid, wherein the fastening member is arranged to extend through the body portion of the luggage rack to connect to the screw post, such that the transparent lid is arranged to fixedly cover the opening of the body portion.

9. The roof luggage rack according to claim 8, wherein a plurality of screw posts are arranged on the transparent lid along a central line of a length direction of the transparent lid and uniformly spaced apart from each other.

10. The roof luggage rack according to claim 7, wherein
    a side of the transparent lid facing the body portion of the luggage rack is arranged with a screw post having a cavity, a nut is arranged to sleeve the screw post having the cavity; and
    the roof luggage rack comprises:
    a screw, arranged on a side of the body portion away from the transparent lid,
    wherein the screw extend through the body portion to connect to the nut, such that the transparent lid is fixed to cover the opening of the body portion.

11. A roof luggage rack assembly, comprising: two longitudinal rods and two cross rods, wherein
    the two cross rods are arranged between the two longitudinal rods and perpendicular to both the two longitudinal rods;
    at least one of the two longitudinal rods comprises a body portion and an illuminator, wherein the body portion defines a receiving chamber, and the illuminator is arranged in the receiving chamber;
    the body portion comprises a base and a cover, and the cover is arranged to cover the base to define the receiving chamber;
    the base further comprises: a support portion and a head portion, and the support portion is arranged to support the cover, and the head portion is arranged at each of two ends of the support portion;
    the cover further defines a receiving portion at a position of which the cover contacts the base, wherein the head portion is received in the receiving portion.

12. A vehicle having a roof luggage rack, comprising:
    a body portion of the roof luggage rack, defining a receiving chamber;
    an illuminator, arranged in the receiving chamber of the body portion of the roof luggage rack;
    a vehicle portion, arranged to support the body portion of the roof luggage rack; and
    a fastening member, arranged to fasten the body portion of the roof luggage rack with the vehicle portion;

wherein the body portion comprises a base and a cover, and the cover is arranged to cover the base to define the receiving chamber;

the base further comprises: a support portion and a head portion, and the support portion is arranged to support the cover, and the head portion is arranged at each of two ends of the support portion;

the cover further defines a receiving portion at a position of which the cover contacts the base, wherein the head portion is received in the receiving portion.

13. The vehicle having a roof luggage rack according to claim 12, wherein the fastening member comprises: a mount, a first bolt, and a second bolt, wherein the second bolt is arranged to extend through the mount to connect to the vehicle portion to fix the mount with the vehicle portion; and the first bolt is arranged to extend through the body portion of the roof luggage rack to connect to the mount to fix the body portion of the roof luggage rack with the mount.

14. The vehicle having a roof luggage rack according to claim 4, wherein the second bolt is a hollow bolt; and the vehicle further comprises a wire, wherein an end of the wire is connected to the illuminator, and the other end of the wire is arranged to extend through the body portion of the roof luggage rack and the hollow bolt to reach an inside of the vehicle portion, and the wire is completely covered by the hollow bolt.

15. The vehicle having a roof luggage rack according to claim 4, wherein the fastening member further comprises a pad, wherein the first bolt is arranged to extend through the pad to fasten the body portion of the roof luggage rack with the fastening member to improve a friction between the first bolt and the body portion of the luggage rack and limit the first bolt from sliding away.

16. The vehicle having a roof luggage rack according to claim 12, wherein the fastening member further comprises a sealing rubber, arranged to surround a contact position between the vehicle portion and the mount to prevent external contaminants from entering the vehicle portion and the body portion of the roof luggage rack.

* * * * *